United States Patent [19]

Werner et al.

[11] Patent Number: 4,581,387

[45] Date of Patent: Apr. 8, 1986

[54] INTERNAL RELEASE AGENTS FOR POLYISOCYANATE ADDITION POLYMERIZATION, THEIR USE IN THE PREPARATION OF CELLULAR, MICROCELLULAR, AND NONCELLULAR POLYURETHANE-POLYUREA MOLDED PARTS HAVING IMPROVED DEMOLDING PROPERTIES

[75] Inventors: Frank Werner, Neustadt; Matthias Marx, Bad Durkheim; Hans U. Schmidt, Ludwigshafen, all of Fed. Rep. of Germany

[73] Assignee: BASF Aktiengesellschaft, Ludwigshafen, Fed. Rep. of Germany

[21] Appl. No.: 701,128

[22] Filed: Feb. 13, 1985

[30] Foreign Application Priority Data

Feb. 18, 1984 [DE] Fed. Rep. of Germany ....... 3405875

[51] Int. Cl.[4] ...................... C08G 18/14; C08G 18/08; C09K 3/00
[52] U.S. Cl. .................................... 521/128; 252/182; 521/130; 521/109.1; 528/42; 528/44; 528/74.5
[58] Field of Search ...................... 521/128, 130, 109.1; 528/44, 42; 252/182; 528/74.5; 260/101, 102

[56] References Cited

U.S. PATENT DOCUMENTS

| | | | |
|---|---|---|---|
| 2,941,943 | 6/1960 | Kirkpatrick et al. | 260/102 |
| 3,134,759 | 5/1964 | Kirkpatrick et al. | 260/102 |
| 3,925,527 | 12/1975 | Kleimann et al. | 521/128 |
| 4,058,492 | 11/1977 | Von Bonin et al. | 260/2.5 AM |
| 4,130,698 | 12/1978 | Sparrow et al. | 521/130 |
| 4,201,847 | 5/1980 | Kleimann et al. | 521/130 |
| 4,220,727 | 9/1980 | Godlewski et al. | 521/128 |
| 4,254,228 | 3/1981 | Kleimann et al. | 521/128 |

OTHER PUBLICATIONS

Warth, Chemistry & Technology of Waxes, 2nd Ed., Reinhold (N.Y.), 1956, pp. 568, 360–368.

*Primary Examiner*—Herbert S. Cockeram
*Attorney, Agent, or Firm*—William G. Conger; Joseph D. Michaels

[57] ABSTRACT

The invention relates to a process for the preparation of cellular, microcellular, and noncellular polyurethane polyurea molded parts with improved demolding characteristics through the reaction injection molding technique wherein unique internal mold release agents are used which are esters and/or amides prepared by reacting a mixture of montanic acid and a carboxylic acid having ten or more carbon atoms with a polyol, alkanolamine, or polyamine.

19 Claims, No Drawings

INTERNAL RELEASE AGENTS FOR POLYISOCYANATE ADDITION POLYMERIZATION, THEIR USE IN THE PREPARATION OF CELLULAR, MICROCELLULAR, AND NONCELLULAR POLYURETHANE-POLYUREA MOLDED PARTS HAVING IMPROVED DEMOLDING PROPERTIES

BACKGROUND OF THE INVENTION

1. Field of the Invention

The invention relates to internal mold release agents useful for the preparation of molded parts by reaction injection molding. More particularly, the invention relates to mold releases prepared by the amidation or esterification of mixtures of montanic acid and carboxylic acids having more than ten carbons, with polyols, alkanolamines, and polyamines

2. Description of Related Art

The preparation of cellular, microcellular, and noncellular molded parts having a closed surface layer made from polyurethane-polyurea elastomers by means of the injection molding technique in closed molds is the subject of numerous technical and patent publications. For example, Federal Republic of Germany published application No. 26 22 951 (U.S. Pat. No. 4,218,543) describes polyurethane systems containing organic polyisocyanates; polyols; reactive aromatic diamines or polyamines which are substituted by alkyl groups in the ortho position of the amino groups; and powerful catalysts for the reaction between the hydroxyl and isocyanate groups. The extremely rapid reaction between these basic components has been claimed to eliminate the need to use release agents to demold the molded parts from polished metal molds In spite of these claims, however, the use of release agents based on wax or silicone as well as of internal release agents such as those cited in Federal Republic of Germany application No. 19 53 637 (U.S. Pat. No. 3,726,952) and Federal Republic of Germany application No. 21 21 670 (GB No. 1,365,215) is widespread.

As illustrative of such release agents, Federal Republic of Germany application No. 19 53 637 discloses salts derived from an organic acid which is aliphatic mono- or polycarboxylic acid having at least 25 aliphatic carbon atoms with a base which may be a primary mono-, di-, or polyamines having two or more carbon atoms, or an amide or ester group-containing amine having at least one primary, secondary, or tertiary amino group. In Federal Republic of Germany application No. 21 21 670, on the other hand, reference is made to a mixture of at least two compounds of the group consisting of amine carboxylic acid salts disclosed in accordance with Federal Republic of Germany application No. 19 53 537; the saturated and unsaturated COOH- and/or OH-group-containing esters of mono- and/or polycarboxylic acids; and polyfunctional alcohols, or natural and/or synthetic oils, fats, or waxes, for use as release agents.

Despite the use of these release agents, in primary aromatic diamine containing formulations used for producing polyurethane-polyurea molded parts by means of injection molding techniques, generally all that can be achieved is a slight improvement in self-release properties. When release agents containing acid groups, in particular carboxylic acid groups, are used, a further disadvantage is that the catalysis of the highly reactive formulation is disrupted, so that molded parts are produced which have insufficient initial green strength.

To avoid this disadvantage, European published application No. 81 701 uses as the polyol component, polyethers containing at least 50 percent primary and/or secondary amino groups. In this way, the use of external release agents is avoided. However, using expensive polyether polyamines not only increases the cost of the resulting molded parts, it also limits their general application because of the resulting change in physical properties.

SUMMARY OF THE INVENTION

The objective of the subject invention is to provide internal release agents which do not exhibit the aforementioned disadvantages, which can be used successfully in conjunction with polyols conventionally utilized, and which lead to a significant improvement in self-releasing properties in the production of molded parts.

This objective was unexpectedly attained by the use of carboxylic acid esters and/or carboxylic acid amides which contain the montanic acid radical as a primary component. Hence, the subject invention is a process for the one-shot preparation of cellular, microcellular and noncellular polyurethane-polyurea molded parts by reaction injection molding wherein polyisocyanates, polyols, aromatic diamines, and chain extenders are reacted in the presence of suitable catalysts, internal release agents, optional blowing agents, auxiliaries, and additives, the improvement comprising utilizing as the internal release agent at least one compound selected from the group consisting of carboxylic acid esters, amides, and esteramides prepared by the reaction of a mixture of montanic acid and at least one aliphatic carboxylic acid having ten or more carbons with at least one reactive hydrogen compound selected from the group consisting of polyols, alkanolamines, and polyamines, wherein said reactive hydrogen compounds having a functionality of at least two, and a molecular weight of from 60 to 400.

The invention also relates to internal release agents for the preparation of molded parts using the polyisocyanate polyaddition process in open or closed molds, said internal release agents being comprised of carboxylic acid ester and/or carboxylic acid amides containing tertiary amino groups in bonded form and prepared through the esterification or amidation of a mixture of from 5 to 95 weight percent based on the total weight of the carboxylic acid mixture, montanic acid and at least one aliphatic carboxylic acid having at least 10 carbon atoms, with at least difunctional alkanolamines and/or polyamines containing tertiary amino groups in bonded form.

Since none of the known release agents or their combinations produced a satisfactory release effect, it was unexpected that mixed esters, mixed amides, and/or their mixtures, prepared by conventional methods using a carboxylic acid mixture of montanic acid and aliphatic carboxylic acids having at least 10 carbon atoms, would have this excellent release effect in the preparation of molded parts based on a polyisocyanate polyaddition reaction. The carboxylic acid amides, and more preferably, carboxylic acid esters containing tertiary amino groups, used in accordance with this invention have the additional advantage that these compounds do not tend to exude or migrate out of the finished parts. Furthermore, they also exhibit a very good release effect for other polyisocyante polyaddition reactions—for example, in the preparation of molded parts based on polyurethanes polyisocyanurates or polycarbodiimides. It is also worth noting that the paintability of the molded parts is not impaired by the use of the release agents used in accordance with the invention, while with previously known release agents, paintability was often rendered impossible.

DESCRIPTION OF THE PREFERRED EMBODIMENTS

Typical organic polyisocyanates used in the process of the subject invention are aliphatic, cycloaliphatic, araliphatic, and preferably aromatic polyfunctional isocyanates. Specific examples are: alkylene diisocyanates having from 4 to 12 carbon atoms in the alkylene radical such as 1,12-dodecane diisocyanate, 1,4-tetramethylene diisocyanate, and preferably 1,6-hexamethylene diisocyanate, cycloaliphatic diisocyanates, such as 1,3- and 1,4-cyclohexane diisocyanate and their mixtures, 1-isocyanato-3,3,5-trimethyl-5-isocyanatomethylcyclohexane (isophorone diisocyanate), 2,4- and 2,6-hexahydrotoluene diisocyanate and their mixtures, 4,4'-, 2,2'- and 2,4'-dicyclohexylmethane diisocyanate and their mixtures; and preferably, aromatic di- and polyisocyanates such as 4,4'-, 2,4'- and 2,2'-diisocyanatodiphenylmethane and their mixtures, 2,4- and 2,6-diisocyanatotoluene and their mixtures, 1,5-diisocyanatonaphthalene, polyphenyl-polymethylene polyisocyanates, 2,4,6-triisocyanatotoluene, and preferably mixtures of diphenylmethane diisocyanates and polyphenyl polymethylene polyisocyanates (polymeric MDI).

Frequently, modified polyfunctional isocyanates are used. Typical modified organic di- and polyisocyanates are: carbodiimide group-containing polyisocyanates in accordance with Federal Republic of Germany Pat. No. 10 92 007; allophanate group-containing polyisocyanates, for example those described in British Pat. No. 994,890, the references disclosed in Belgian Pat. No. 671,626, and in Dutch published application No. 71 02 524; isocyanurate group-containing polyisocyanates such as those described in Federal Republic of Germany Pat. Nos. 10 22 789, 12 22 067, 10 27 394 and Federal Republic of Germany published application Nos. 19 29 034, and 20 04 048; urethane group-containing polyisocyanates such as those described in the references cited in Belgian Pat. No. 752,261, or as described in U.S. Pat. No. 3,394,164; acylated urea group-containing polyisocyanates such as those described in Federal Republic of Germany Pat. No. 12 30 778; biuret group-containing polyisocyanates such as those described in Federal Republic of Germany Pat. No. 11 01 394 and British Pat. No. 889 050; polyisocyanates prepared by means of telomerization reactions as described in the references in Belgian Pat. No. 723,640, ester group-containing polyisocyanates as disclosed in British Pat. Nos. 965,474 and 1,072,956, in U.S. Pat. No. 3,567,765, and in Federal Republic of Germany Pat. No. 12 31 688.

Preferably though, the following are used: urethane group-containing polyisocyanates such as those prepared from isocyanates such as 4,4'- and/or 2,4'-diphenylmethane diisocyanate or toluene diisocyanate or 2,4- and/or 2,6-toluene diisocyanate by reaction with low molecular weight linear or branched alkanediols, dialkylene glycols, or polyoxyalkylene glycols having molecular weight of up to 800 prepared from ethylene oxide, 1,2-propylene oxide, or their mixtures; carbodiimide group- and/or isocyanurate ring-containing polyisocyanates, for example those derived from 4,4'-, 2,4'-diphenylmethane diisocyanate, 2,4- and/or 2,6-toluene diisocyanate, and, preferably, 4,4'-diphenylmethane diisocyanate, mixtures of 2,4'- and 4,4'-diphenylmethane diisocyanate, toluene diisocyanates, mixtures of diphenylmethane diisocyanates and polyphenyl polymethylene polyisocyanates (polymeric MDI) and mixtures of toluene diisocyanates and polymeric MDI.

The polyols utilized in the polyurethane-polyurea reaction have at least two reactive hydrogen atoms, a functionality of from 2 to 8, preferably from 2 to 4, and a molecular weight of from 1000 to 8000, preferably from 1200 to 6000. For example, polyether polyamines and/or perferably polyols selected from the group consisting of the polyether polyols, polyester polyols, polythioether polyols, polyesteramides, hydroxyl group-containing polyacetals, and hydroxyl group-containing aliphatic polycarbonates or mixtures of these polyols have proven to be suitable. Preferably, polyester polyols and polyether polyols are used.

Suitable polyester polyols can be prepared, for example, from organic dicarboxylic acids having from 2 to 12 carbon atoms, preferably aliphatic dicarboxylic acids having from 4 to 6 carbon atoms, and polyfunctional alcohols, preferably diols having from 2 to 12 carbon atoms, more preferably from 2 to 6 carbon atoms. Typical dicarboxylic acids are: succinic acid, glutaric acid, adipic acid, suberic acid, azelaic acid, sebacic acid, decane dicarboxylic acid, maleic acid, and fumaric acid. The dicarboxylic acids may be used individually or in mixtures with one another. Instead of the free dicarboxylic acids, corresponding dicarboxylic acid derivatives may also be used, for example dicarboxylic acid esters of alcohols having from 1 to 4 carbon atoms, or dicarboxylic anhydrides. Preferably used are dicarboxylic acid mixtures of succinic acid, glutaric acid, and adipic acid, in proportions of 20–35:35–50:20–32 parts by weight, and in particular adipic acid. Examples of di- and polyfunctional alcohols, in particular, diols, are: ethanediol, diethylene glycol, 1,2- and 1,3-propanediol, dipropylene glycol, 1,4-butanediol, 1,5-pentanediol, 1,6-hexanediol, 1,10-decanediol. Examples of triols are glycerin and trimethylolpropane. Preferably used are ethanediol, diethylene glycol, 1,4-butanediol, 1,5- pentanediol, 1,6-hexanediol, or mixtures of two or more of the cited diols, preferably mixtures of 1,4-butanediol, 1,5-pentanediol, and 1,6-hexanediol. In addition, polyester polyols from lactones, for example ε-caprolactone, or hydroxycarboxylic acids for example δ-hydroxycaproic acid may be used. The polyester polyols preferably have a functionality of from 2 to 3 and a molecular weight of from 1000 to 3000, more preferably from 1800 to 2500.

The preferred polyols for use in the process of the subject invention are the polyether polyols. These polyols are prepared through anionic polymerization using alkali hydroxides such as sodium or potassium hydroxide, or alkali alkoxides such as sodium methoxide, sodium or potassium ethoxide, or potassium isopropoxide as catalysts. They may also be prepared by cationic polymerization with Lewis acids such as antimony pentachloride, boron trifluoride etherate, or bleaching earth as catalyst. Generally, one or more cyclic ethers having from 2 to 4 carbon atoms, and an initiator containing from 2 to 8, preferably 2 to 4, reactive hydrogen atoms are utilized in the preparation of these polyethers.

Suitable cyclic ethers are, for example: tetrahydrofuran, and alkylene oxides such as 1,3-propylene oxide, 1,2- and 2,3-butylene oxide, styrene oxide, and epichlorohydrin. Preferably ethylene oxide and 1,2 propylene oxide are utilized. The alkylene oxides may be used individually, alternately one after another, or as mixtures. Typical initiator molecules are: water, organic dicarboxylic acids such as succinic acid, adipic acid, phthalic acid, and terephthalic acid; aliphatic and aromatic optionally N-mono, N,N- and N,N'-dialkyl-substituted diamines having from 1 to 4 carbon atoms in the alkyl radical such as mono- and dialkyl-substituted ethylenediamine, diethylenetriamine, triethylenetetramine, 1,3-propylenediamine, 1,3- or 1,4-butylenediamine, 1,2-1,3-1,4-, 1,5-, 1,6-hexamethylenediamine, phenylenediamines, 2,4- and 2,6-toluenediamine, and 4,4'-, 2,4'- and 2,2'-diaminodiphenylmethanes.

Alkanolamines such as ethanolamine, diethanolamine, N-methyl- and N-ethyl-ethanolamine, N-methyl- and N-ethyldiethanolamine and triethanolamine, ammonia, hydrazine and hydrazides may also be used as initiators. Preferably used are polyfunctional, more preferably di- and/or trifunctional alcohols such as ethanediol, 1,2-propanediol and 1,3-propanediol diethylene glycol, dipropylene glycol, 1,4,-butanediol, 1,6-hexane diol, glycerin, trimethylolpropane, pentaerythritol, sorbitol and sucrose.

Preferably the polyether polyols have a functionality of from 2 to 4, and molecular weights from 1000 to 8000, preferably from 1200 to 6000 and more preferably from 1800 to 4000. Like the polyester polyols they may be used individually or as mixtures. In addition, they may be mixed with polyester polyols as well as with hydroxyl group-containing polyesteramines, polyacetals, polycarbonates, and/or polyether polyamines.

Typical hydroxyl group-containing polyacetals are compounds which may be prepared from glycols such as diethylene glycol, triethylene glycol, 4,4'-dihydroxyethoxydiphenyldimethylmethane, hexanediol and formaldehyde. Suitable polyol acetals can also be prepared through the polymerization of cyclic acetals.

The conventional hydroxyl group-containing polycarbonates which may be used are those of the type which may be prepared, for example, by the reaction of diols such as 1,3-propanediol, 1,4-butanediol, and/or 1,6-hexanediol, diethylene glycol, triethylene glycol, or tetraethylene glycol, with diarylcarbonates such as diphenyl carbonate, or with phosgene.

Typical polyesteramides are those which are obtained from polyfunctional saturated and/or unsaturated carboxylic acids or their anhydrides, by reaction with polyfunctional saturated and/or unsaturated amino alcohols, mixtures of polyfunctional alcohols and amino alcohols, or polyamides. Preferably used are linear condensates.

Suitable polyether polyamines may be prepared from polyether polyols using conventional methods. Typical examples are the cyanoalkylation of polyoxyalkylene polyols followed by the subsequent hydrogenation of the nitrile which is formed (U.S. Pat. No. 3,267,050), or the amination of the polyoxyalkylene polyols with amines or ammonia in the presence of hydrogen and catalysts (Federal Republic of Germany Pat. No. 12 15 373).

The aromatic diamines used in the process of the invention are those whose primary amino groups are sterically hindered with respect to polyisocyanates by the presence of at least one alkyl substituent in the ortho position relative to each amino group. Mixtures of such sterically hindered diamines and more "reactive" diames may also be used.

Preferably used are mixtures of diamines containing from 99.9 to 50 percent by weight, preferably from 78 to 65 percent by weight of at least one sterically hindered primary aromatic diamine whose amino groups are sterically hindered with respect to polyisocyanates by the presence of at least one alkyl substituent in the ortho position relative to each amino group, and from 0.1 to 50 percent by weight, preferably from 22 to 35 percent by weight, of at least one unsubstituted or substituted reactive primary aromatic diamine whose amino groups do not exhibit any reduced reactivity with respect to the polyisocyanates caused by the presence of electrophilic substituents or which exhibit reduced reactivity as a result of steric hindrance, wherein the percents by weight are based on the total weight of the aromatic diamine mixture.

Especially well suited are primary aromatic diamine mixtures which are liquid at room temperature and which are completely, or at least partially miscible with the polyol component at the processing conditions.

Alkyl-substituted metaphenylenediamines of the following formulas have proven to be effective as the sterically hindered primary aromatic diamine and are therefore preferred:

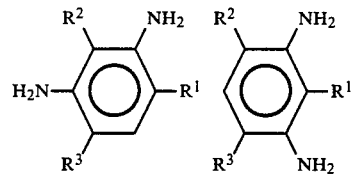

in which $R_1$ is a hydrogen atom or a linear or branched alkyl radical having from 1 to 12 carbon atoms, preferably from 1 to 6 carbon atoms, and $R_2$ and $R_3$ are the same or different, linear or branched alkyl radicals having from 1 to 4 carbon atoms such as a methyl, ethyl, propyl, isopropyl, butyl, or sec-butyl radical.

Particularly suitable are those branched alkyl radicals $R_1$ in which the branching point is located at the $C_1$ carbon atom. In addition to hydrogen, the following typical alkyl radicals $R_1$ may be cited: methyl, ethyl, n- and isopropyl, butyl, hexyl, octyl, decyl, 1-methyloctyl, 2-ethyloctyl, 1-methylhexyl, 1,1-dimethylpentyl, 1,3,3-trimethylhexyl, 1-ethylpentyl, 2-ethylpentyl, and preferably the cyclohexyl, 1-methyl-n-propyl, tert-butyl, 1-ethyl-n-propyl, 1-methyl-n-butyl, and 1,1-dimethyl-n-propyl radical.

Typical alkyl substituted m-phenylenediamines are: 2,4-dimethyl-, 2,4-diethyl-, 2,4-diisopropyl-, 2,4--diethyl-6-methyl, 2-methyl-4,6-diethyl-, 2,4,6-triethyl-, 2,4-dimethyl-6-cyclohexyl, 2-cyclohexyl-4,6-diethyl-, 2-cyclohexyl-2,6-diisopropyl-, 2,4-dimethyl-6-(1-ethyl-n-propyl)-, 2,4-dimethyl-6-(1,1-dimethyl-n-propyl)-, and 2-(1-methyl-n-butyl)-4,6-dimethyl-1,3-phenylenediamines.

In addition, alkyl-substituted diaminodiphenylmethanes, have also proven to be successful, for example, 3,3'-di- and 3,3',5,5'-tetra-n-alkyl substituted 4,4'-diaminodiphenylmethanes such as 3,3'-diethyl-, 3,3',5,5'-tetraethyl- and 3,3',5,5'-tetra-(n-propyl)-4,4'-diaminodiphenylmethane have proven to be successful.

Preferably used are diaminodiphenylmethanes of formula

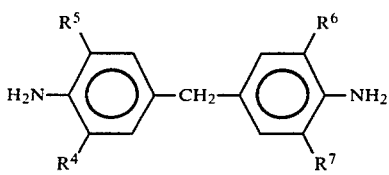

in which R$_4$, R$_5$, R$_6$ and R$_7$ are the same or different and may represent ethyl, propyl, isopropyl, sec-butyl, or tert-butyl radicals, whereby at least one of the radicals must be an isopropyl or sec-butyl radical. The alkyl-substituted 4,4'-diaminodiphenylmethanes can also be used as mixtures with isomers having formulas

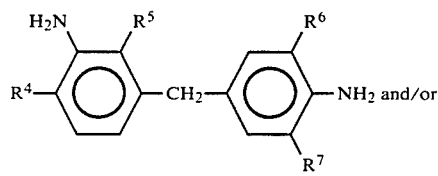

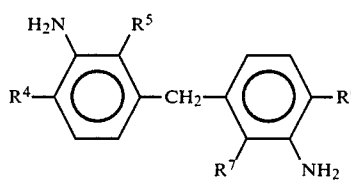

where R$_4$, R$_5$, R$_6$, and R$_7$ have the meaning stated above.

Typical examples are: 3,3',5-trimethyl-5'-isopropyl-, 3,3',5-triethyl-5'-isopropyl-, 3,3',5-trimethyl-5'-sec-butyl-, 3,3',5-triethyl-5-sec-butyl-4,4'-diaminodiphenylmethanes, 3,3'-dimethyl-5,5'-diisopropyl-, 3,3'-diethyl-5,5'-diisopropyl-, 3,3'-dimethyl-5,5'-bis(sec-butyl)-, 3,3'-diethyl-5,5'-bis(sec-butyl)-, 3,5-dimethyl-3',5'-diisopropyl-, 3,5-diethyl-3',5'-diisopropyl-, 3,5-dimethyl-3',5'-bis(sec-butyl)-, 3,5-diethyl-3',5'-bis(sec-butyl)-4,4'-diaminodiphenylmethanes. 3-methyl-3',5,5'-triisopropyl-, 3-ethyl-3',5,5'-triisopropyl-, 3-methyl-3'5,5'-tri-sec-butyl-, 3-ethyl-3',5,5'-tris(sec-butyl)-4,4'-diaminodiphenylmethane, 3,3'-diisopropyl-5,5'-bis(sec-butyl)-3,5-diisopropyl-, 3,5'-bis(sec-butyl)-, 3-ethyl-5-sec-butyl-3',5'-diisopropyl-, 3-methyl-5-tert-butyl-3',5'-diisopropyl-, 3-ethyl-5-sec-butyl-3'-methyl-5'-tert-butyl-, 3,3',5,5'-tetraisopropyl- and 3,3',5,5'-tetrakis(sec-butyl)-4,4'-diaminodiphenylmethane.

The following primary aromatic diamines (a) are preferably used: 2,4-diethyl, 2,4-dimethyl-1,3-phenylenediamines; 2,4-diethyl-6-methyl-, 2-methyl-4,6-diethyl-1,3-phenylenediamines; 2,4,6-triethyl-1,3-phenylenediamine; 2,4-dimethyl-6-tert-butyl-, 2,4-dimethyl-6-isooctyl-, and 2,4-dimethyl-6-cyclohexyl-1,3-phenylenediamine, 3,5-dimethyl-3',5'-diisopropyl- and 3,3',5,5'-tetraisopropyl-4,4'-diaminodiphenylmethane.

The sterically hindered primary aromatic amines can be utilized individually or in the form of mixtures, for examples, mixtures of alklyl-substituted 1,3-phenylenediamines, 3,3'-di- and/or 3,3',5,5'-tetraalkyl-substituted 4,4'-diaminodiphenylmethanes. In addition, the primary aromatic diamines can be mixed with a maximum of 50 percent by weight, based on the total weight of primary alkylsubstituted aromatic tri- to pentamines, such as polyphenyl polymethylene polyamines, whereby the aromatic polyamines are substituted with an alkyl radical in at least one ortho position relative to the amino groups.

Preferably, unsubstituted primary aromatic diamines are used as the reactive aromatic diamine component. However, substituted primary diamines are also suitable, preferably mono alkyl-substituted aromatic diamines in which the reactivity of the amino groups is not negatively affected by the substituents. Specifically, typical examples are: 1,2-, 1,3-, and 1,4-phenylenediamine, benzidine, 4,4'- and 2,4'-diaminodiphenylmethane, 4,4'-diaminodiphenyl ether, 1,5-diaminonaphthalene, 1,8-diaminonaphthalene, 3,4-, 2,4-, and 2,6-toluenediamine. The reactive aromatic diamines may, like the sterically hindered aromatic diamines, be used individually or as mixtures. Preferably, 2,4- and/or 2,6-toluenediamine are used, more preferably 1,3-phenylenediamine.

Preferably mixtures of from 80 to 50 percent by weight 2,4-dimethyl-6-tert-butyl-1,3-phenylenediamine, 2,4-diethyl-6-methyl- and/or 2-methyl-4,6-diethyl-1,3-phenylenediamine and from 20 to 50 percent by weight 1,3-phenylenediamine are used as the aromatic diamines, wherein these percents by weight are based on the total weight of the mixture of aromatic diamine components.

The aromatic diamines or their mixtures are used in the process of the invention in amounts from 5 to 50 parts by weight, preferably from 10 to 40 parts by weight and more preferably from 15 to 30 parts by weight based on 100 parts by weight of the polyol component.

In some cases it may be desirable to partially replace the mixture of primary aromatic diamines by chain extenders and/or cross-linking agents hereinafter referred to simply as chain extenders, especially for preparing cellular polyurethane-polyurea molded objects. The chain extenders preferably have molecular weights less than 500, more preferably from 30 to 400, and they preferably have two active hydrogen atoms. Typical examples are aliphatic and/or araliphatic diols having from 2 to 14, preferably from 2 to 6 carbon atoms, such as 1,3-propanediol, 1,10-decanediol, diethylene glycol, dipropylene glycol, bis-[2-hydroxyethyl]hydroquinone, and preferably ethylene glycol, 1,4-butanediol, and 1,6-hexanediol, and triols such as glycerin and trimethylolpropane. Low-molecular-weight polyoxyalkylene polyols based on ethylene oxide and/or propylene oxide adducts of the previously noted initiators; and sec-aromatic diamines, of which typical examples are: N,N'-dialkyl-substituted aromatic diamines, which may optionally be substituted by alkyl radicals on the aromatic ring, said alkyl radicals having from 1 to 20, preferably 1 to 4 carbon atoms in the N-alkyl radical, such as N,N'-diethyl-, N,N'-bis[sec-pentyl]-, N,N'-bis[sec-hexyl]-, N,N'-bis[sec-decyl]-, N,N'-dicyclohexyl- p- or -m-phenylenediamines; N,N'-dimethyl-, N,N'-diethyl-, N,N'-diisopropyl-, N,N'-bis[sec-butyl]-, N,N'-dicyclohexyl-4,4'-diaminodiphenylmethanes; and N,N'-bis[sec-butyl]benzidine may also be used as optional chain extenders.

The chain extenders may be used individually or in the form of mixtures. If mixtures of aromatic diamines and chain extenders are used, these mixtures preferably contain from 1 to 40, and more preferably from 5 to 20 parts by weight of chain extender per 100 parts by weight aromatic diamine.

The carboxylic acid amides and carboxylic acid esters used as internal release agents in accordance with the invention are prepared by the amidation or esterification of a mixture of montanic acid with at least one aliphatic carboxylic acid having at least 10 carbon atoms, preferably from 14 to 25 carbon atoms, with at least difunctional polyamines, polyols, or alkanolamines having molecular weights from 60 to 400, preferably from 60 to 200. Preferably, the carboxylic mixtures of montanic acid and aliphatic carboxylic acid contain from 5 to 95 percent by weight montanic acid, more preferably from 20 to 60 percent by weight.

Suitable montanic acids have melting points from 76° to 87° C. preferably from 76° to 81° C., acid numbers from 115 to 155, preferably from 135 to 150, and soap numbers from 140 to 175, preferably from 155 to 175. Montanic acids with these characteristics are known, for example, under the trade name S-Wachs.

Typical examples of aliphatic carboxylic acids having at least 10 carbon atoms are: stearic acid, palmitic acid, ricinoleic acid, linoleic acid, linolenic acid, behenic acid, tallow oil fatty acid, fish oil fatty acid, lauric acid, and preferably tall oil fatty acids and/or oleic acid.

Primary, secondary and tertiary amines having a functionality of from 2 to 4 and a molecular weight of 60 to 400 are use as the polyamines, for example ethylenediamine, 1,2- or 1,3-propylenediamine, 1,4-butylenediamine, 1,6-hexamethylenediamine, neopentyldiamine, dipropylenetriamine, diethylenetriamine, 4,9-dioxadodecane-1,12-diamine, N,N'-bis-[3-aminopropyl] ethylenediamine, and preferably tris[aminoethyl]amine, tris[3-aminopropyl]amine, 1-(2-aminoethyl)piperazine and 1,4-bis[3-aminopropyl]piperazine.

Suitable polyols have a functionality of from 2 to 6 and a molecular weight of from 62 to 400. Typical examples are ethylene glycol, propylene glycol, butylene glycol, hexamethylene glycol, neopentyl glycol, glycerin, trimethylolopropane, pentaerythritol, sorbitol, or addition products of these alcohols or diamines with one or more alkylene oxides. Suitable, for example, are addition products of ethylene and/or 1,2-propylene oxide on ethylene glycol, propylene glycol, glycerin, trimethylolpropane or ethylenediamine.

Alkanolamines having a functionality of from 2 to 3 and molecular weights from 61 to 400 may be used, for example ethanolamine, N-methyl-N-butyl-, N-neopentyl-, and N-cyclohexylethanolamine; N-methylisopropanolamine, diethanolamine; dipropanolamine; N-alkyldialkanolamines having from 1 to 20 carbon atoms in the alkyl radical, such as N-methyl-, N-butyl-, N-(2-ethylhexyl)-, N-cyclohexyl-, N-dodecyl diethanol amines or N-methyl-, N-butyl-, N-2-(ethylhexyl)-, N-cyclohexyl-, N-dodecyl diisopropanolamines, hydroxyethyl-, 1,4-dihydroxyethyl-, and 1,4-diisopropanolpiperazines, tripropanolamine, tributanolamine, and preferably triethanolamine and triisopropanolamine.

The polyols, polyamines, and alkanolamines can be used individually or in the form of mixtures. Particularly well suited and therefore preferred are polyamines and in particular alkanolamines, which in addition to having at least two reactive functional groups also still contain at least one tertiary amino group.

The mold release agents of the invention posess molecular weights from 388 to 1790, preferably from 600 to 1300, acid numbers less than 10, preferably less than 5 to 0.5, and amine or hydroxyl numbers from 0 to 100, preferably from 0 to 60. They are used in amounts of from 0.1 to 20 percent by weight, preferably from 1 to 10 percent by weight, based on the total weight of the polyisocyanate, polyol, aromatic diamine and chain extender starting components.

The preparation of carboxylic acid amides and esters is advantageously achieved by the condensation of the carboxylic acids and at least one difunctional polyol, polyamine, and alkanolamine at temperatures in excess of 100° C., preferably from 180° C. to 220° C., in some cases under vacuum. The splitting off of water in the polycondensation reaction is continued until the desired chemical properties such as acid number, hydroxyl number, amine number, and average molecular weight are attained. The polycondensation can be performed in the presence of acidic or basic catalysts, and the water may be removed by azeotropic distillation.

Carboxylic acid esters having molecular weights of from 1020 to 1230, acid numbers of from 0,5, to 5, and hydroxyl numbers of from 0 to 60 which are obtained through the esterification of a mixture of 1 mole montanic acid and 2 moles tall oil fatty acid and/or oleic acid with 1 mole triethanolamine and/or triisopropylamine are found to be highly suitable release agents.

As the preferred catalysts, those compounds are used which greatly accelerate the reaction of the hydroxyl group-containing polyols and hydroxyl group-containing optional chain extenders with the polyisocyanates. Included are organometallic compounds, preferably organic tin compounds such as tin(II) salts of organic carboxylic acids, such as tin(II) acetate, tin(II) octoate, tin(II) ethylhexoate and tin(II) laurate, and the dialkyl tin(IV) salts of organic carboxylic acids such as dibutyl tin diacetate, dibutyl tin dilaurate, dibutyl tin maleate and dioctyl tin diacetate. The organometallic compounds are used alone or preferably in combination with strongly basic amines, typical examples of which are amidines such as 2,3-dimethyl-3,4,5,6-tetrahydropyrimidine; tertiary amines, such as triethylamine, tributylamine, dimethylbenzylamine, N-methyl-, N-ethyl-, and N-cyclohexylmorpholine, N,N,N',N'-tetramethylethylenediamine, N,N,N', N'-tetramethylbutanediamine, pentamethyldiethylenetriamine, tetramethyldiaminoethyl ether, bis(dimethylaminopropyl)urea, dimethylpiperazine, 1,2-dimethylimidazole, 1-aza-bicyclo[3.3.0]octane, and preferably 1,4-diaza-bicyclo[2.2.2]octane; and alkanol compounds such as triethanolamine, triisopropanolamine, N-methyl- and N-ethyldiethanolamine, and dimethylethanolamine.

Typical catalysts are also: tris(dialkylaminoalkyl)-s-hexahydrotriazines, in particular tris(N,N-dimethylaminopropyl)-s-hexahydrotriazine; tetraalkyl ammonium hydroxides such as tetramethylammonium hydroxide, alkali hydroxides, such as sodium hydroxide and alkali alkoxides, such as sodium methoxide and potassium isopropoxide, and alkali salts of long-chain fatty acids having 10 to 20 carbon atoms and optionally side-positioned hydroxyl groups. Preferably used are from 0.001 to 5 percent by weight, more preferably 0.05 to 2 percent by weight of catalyst or catalyst combinations, based on the weight of the polyol component.

Among the blowing agents which may optionally be used in the process of the invention is water, a "reactive" blowing agent which reacts with isocyanate groups to form carbon dioxide. The amounts of water which are preferably used range from 0.5 to 2 percent by weight based on the weight of the polyol component.

Other blowing agents which may be used are low-boiling-point liquids, which vaporize as a result of the exothermic nature of the polyaddition reaction. Suitable blowing agents are those which are inert to the organic polyisocyanate and which having boiling points under 100° C. Examples of such preferably used liquids include halogenated hydrocarbons such as methylene chloride, trichlorofluoromethane, dichlorodifluoromethane, dichloromonofluoromethane, dichlorotetrafluoroethane, and 1,1,2-trichloro-1,2,2-trifluoroethane. Mixtures of these low-boiling-point liquids with one another and/or with other substituted or unsubstituted hydrocarbons may also be used as blowing agents.

The most desirable amount of low-boiling-point liquid to use in preparing cellular polyurethane polyurea molded objects depends on the density which is desired as well as on whether water is also used. Generally, amounts from 0.5 to 15 parts by weight based on 100 parts by weight of the polyol component produces satisfactory results.

Auxiliaries and additives can also be incorporated in the reaction mixture. Typical examples well known to those skilled in the art are surfactants, foam stabilizers, cell regulators, fillers, colorants, pigments, flame retardants, agents to protect against hydrolysis, fungistats, and bacteriostats.

Surfactants which may be used are those compounds which are used to support the homogenation of the basic components and which may also be suitable for controlling cell structure. Typical examples are emulsifiers such as the sodium salts of castor oil sulfates or of fatty acids; salts of fatty acids with amines, for example oleic acid diethylamine or stearic acid diethanolamine; salts of sulfonic acids, for example alkali or ammonium salts of dodecylbenzene- or dinaphthylmethanedisulfonic acid; and ricinoleic acid. Foam stabilizers which may be used are, for example, siloxane oxyalkylene heteropolymers and other organic polysiloxanes; oxyethylated alkyl phenols, oxyethylated fatty alcohols; paraffin oils, castor oil or ricinoleates and Turkey red oil. Examples of cell regulators which may be used are paraffins, fatty alcohols, and dimethylpolysiloxanes. The surfactants, foam stabilizers, and cell regulators are generally used in amounts ranging from 0.01 to 5 parts by weight based on 100 parts by weight of the polyol component.

The fillers which may be used, in particular reinforcing fillers, include conventional organic and inorganic fillers, reinforcing agents, weight-increasing agents, agents to improve paint wear, coating agents, etc. Typical examples are: inorganic fillers such as silicate minerals, for example lamellar silicates such as antigorite, serpentine, hornblendes, amphibole, chrysotile, talcum; metal oxides such as kaolin, aluminum oxide, titanium oxides, and iron oxides; metal salts such as chalk and barium sulfate; inorganic pigments such as cadmium sulfide and zinc sulfide; and glass, asbestos powder, etc. Preferably used are kaolin (China clay), aluminum silicate, coprecipitates of barium sulfate and aluminum silicate, and natural and synthetic fibrous minerals such as asbestos, and wollastonite. In particular, glass fibers of varying lengths, which may optionally also be treated with a size may be used. Typical organic fillers are: coal, melamine, pine resin, cyclopentadienyl resins and graft polymers based on styrene and acrylonitrile, prepared by means of in situ polymerization of acrylonitrile/styrene mixtures in polyether polyols using methods similar to those described in German Patent documents Nos. 11 11 394, 12 22 669, (U.S. Pat. Nos. 3,304,273; 3,383,351; 3,523,093), 11 52 536 (British Pat. No. 1,040,452), and 11 52 537 (British Pat. No. 987,618), and which may thereafter be aminated, as well as filler polyoxyalkylene polyols or polyamines, in which the aqueous polymer dispersions are utilized to form polyoxyalkylene polyol or polyamine dispersions.

The inorganic and organic fillers can be used individually or as mixtures. Preferably used are stable filler/polyoxyalkylene polyol dispersions in which the fillers are reduced in size to less than 7 $\mu$m in situ in the presence of polyoxyalkylene polyols at high localized energy densities and which are simultaneously dispersed by this action. The inorganic and organic fillers are incorporated into the reaction mixture, preferably in amounts ranging from 0.5 to 50 weight percent, more preferably from 1 to 40 weight percent based on the weight of the isocyanate, polyol and chain extender components.

Suitable flame retardants are tricresyl phosphate, tris[2-chloroethyl]phosphate, tris[chloropropyl]phosphate, and 2,3-dibromopropylphosphate. In addition to the halogensubstituted phosphates cited above, inorganic flame retardants may also be used to make the molded object flame resistant, for example hydrated aluminum oxide, antimony trioxide, arsenic oxide, ammonium polyphosphate, and calcium sulfate. Generally, it is preferable to use from 5 to 50 parts by weight, more preferably from 5 to 25 parts by weight, of the cited flame retardants per 100 parts by weight of the polyol component.

Further information on these conventional auxiliaries and additives is found in the literature, in particular in the monograph by J. H. Sanders and K. C. Frisch, *Polyurethanes*, pt. 1 and 2, in *High Polymers* vol. XVI, Interscience Publishers 1962, 1964.

In order to prepare the optionally cellular polyurethane polyurea molded objects, the organic polyisocyanates, polyols containing at least two reactive hydrogen atoms, and aromatic diamines containing up to 30 percent by weight optional chain extenders, are reacted in such amounts that the equivalent ratio of isocyanate groups in the polyisocyanates to the sum of reactive hydrogen atoms in the polyol and chain extender components is from 1:0.85 to 1:1.25, preferably from 1:0.95 to 1:1.15.

The preparation of cellular and preferably dense micro-cellular or noncellular polyurethane polyurea molded objects may be accomplished using a prepolymer process. Preferably, however, a one-shot process utilizing reaction injection molding is used. This process is described, for example, by Piechota and Röhr in *Integralschaumstoff*, Munich, Vienna: Carl-Hanser-Verlag, 1975; D. J. Prepelka and J. L. Wharton in *Journal of Cellular Plastics*, March–April 1975:87–98, and U. Knipp, *Journal of Cellular Plastics*, March–April 1973:76–84.

When using a mixing chamber with several feed nozzles, the basic components can be added individually and mixed intensively in the mixing chamber. It has proven to be particularly advantageous to use a 2-component process and to dissolve the primary aromatic diamine component and optional chain extenders in the polyol, along with any blowing agents, auxiliaries and additives to form the so-called "(A)" component. The organic polyisocyanates, modified polyisocyanates and/or isocyanate prepolymers are then used as the so-called "(B)" component. Here the advantage is that, for example, the (A) and (B) components can be stored separately and can be transported in a space-saving manner, so that they only need to be mixed together in the proper amounts for processing.

The amount of reaction mixture charged to the mold is measured out such that the resulting microcellular or noncellular molded parts have densities of from 1.0 to 1.4 g/cm$^3$, preferably from 1.0 to 1.2 g/cm$^3$, and cellular molded parts have densities of from 0.8 to 1.2 g/cm$^3$, preferably from 0.8 to 1.0 g/cm$^3$. The basic components are charged into the mold at a temperature of from 15° C. to 80° C., preferably from 20° C. to 55° C. Suitable mold temperatures are from 20° C. to 90° C., preferably from 30° C. to 75° C. The degree of compression for preparing microcellular or cellular molded parts ranges from 1.1 to 8, preferably from 2 to 8.

The dense noncellular or microcellular polyurethane polyurea molded objects obtained by the process of the invention are particularly suitable for use in the automobile industry, for example as bumper fascias, impact-protection molding, and body parts such as rain gutters, fenders, spoilers, and wheel well extensions. They may also be used for producing plastic housings, rollers, and shoe soles. The cellular foams are used, for example, as arm rests, head supports, and safety padding in automotive interiors as well as for motorcycle and bicycle seats and for cover layers in foam laminate applications.

The parts cited in the examples which follow are parts by weight.

Preparation of the Mold Release Agents

Release Agent I:

An internal mold release agent was prepared by heating 582.8 parts (2 moles) tall oil fatty acid, 391.0 parts (1 mole) montanic acid, and 191.3 parts (1 mole) triisopropanolamine while stirring at a reduced pressure of 40 torr for 20 hours at 210° C. The resulting fatty acid esters had an average molecular weight of 1111, an acid number of 1.4, and a hydroxyl number of 25.

Resease Agent II:

An internal mold release agent was prepared by the same procedure as for release agent I, however, 565 parts (2 moles) oleic acid, 391 parts (1 mole) montanic acid, and 191.3 parts (1 mole) triisopropanolamine were used as the basic components. The resulting fatty acid esters had an average molecular weight of 1093, an acid number of 1.7, and a hydroxyl number of 43.

Resease Agent III:

An internal mold release agent was prepared by the same procedure as for release agent I, however, 582.8 parts (2 moles) tall oil fatty acid, 391 parts (1 mole) montanic acid, and, 149.2 parts (1 mole) triethanolamine were used as the basic components. The resulting fatty acid esters had an average molecular weight of 1096, an acid number of 2.9, and a hydroxyl number of 54.

Release Agent IV:

An internal mold release agent was prepared by the same procedure as for release agent I, however, 582.8 parts (2 moles) tall oil fatty acid, 391 parts (1 mole) montanic acid, and 134 parts (1 mole) trimethylolpropane were used as the basic components. The resulting fatty acid esters had an average molecular weight of 1053, an acid number of 1.7, and a hydroxyl number of 37.

In the following examples, polyurethane polyurea molded parts were formed by heating the conventional A and B sides of the polyurethane polyurea system (described below) to 50° C. and processing using the reaction injection molding process on a Puromat ® 30 high pressure metering system produced by Elastogran-Maschinenbau in an aluminum mold whose temperature was controlled at 50° C. and which has inside dimensions of 4×400×200 mm to form boards. When no sticking of the boards was observed after multiple demoldings with this mold, the preparation of the boards was discontinued.

EXAMPLE 1

The A component was composed of a mixture of 74.9 parts of a polyoxypropylene polyoxyethylene triol having a hydroxyl number of 26, prepared through the polyaddition of 1,2-propylene oxide on trimethylolpropane as the initiator followed by the subsequent addition of ethylene oxide; 21.0 parts 2,4-dimethyl-6-tert-butyl-1,3-phenylenediamine; 3.0 parts of release agent I; and 1.0 part of 1,4-diazabicyclo[2,2,2]octane dissolved in dipropylene glycol (33 wt. percent solution) and 0.1 parts dibutyl tin dilaurate as catalysts. The B Component was composed of a urethane-modified 4,4'-diphenylmethane diisocyanate having an isocyanate content of 23 percent by weight, prepared by the reaction of 4,4'-diphenylmethane diisocyanate with dipropylene glycol.

One hundred parts of the A component and 50.5 parts of the B component—corresponding to an isocyanate index of 105 were processed into boards. The molding process was discontinued after 25 demoldings were accomplished without any sticking of the boards to the mold. The boards were conditioned for 1 hour at 120° C. and then the following physical properties were measured:

| | |
|---|---|
| Density per DIN 53 420 [kg/m$^3$] | 1058 |
| Tensile strength per DIN 53 504 [N/mm$^2$] | 31.8 |
| Elongation at break per DIN 53 504 [%] | 360 |
| Graves tear test per DIN 53 515 [N/mm] | 86.3 |
| Shore D hardness per DIN 53 505 | 57 |
| Modulus of flexural elasticity per DIN 53 457 [N/mm$^2$] | 391 |

EXAMPLE 2

The A component was composed of a mixture of 72.9 parts of the polyoxypropylene polyoxyethylene triol cited in Example 1; 21.0 parts of 2,4'dimethyl-6-tert-butyl-1,3-phenylenediamine; 5.0 parts of release agent II; 1.0 parts of 1,4-diazabicyclo[2,2,2]octane in dipropylene glycol (33 weight percent solution), and 0.1 parts of dibutyl tin dilaurate as catalysts. The B Component was the same as in Example 1. One hundred parts of the A component and 50.3 parts of the B component, corresponding to an isocyanate index of 105, were processed into boards as in Example 1. After 20 demoldings, no sticking of the boards to the mold was observed, and the preparation of the boards was discontinued.

The following physical properties were measured on a board which had been conditioned for 1 hour at 120° C.:

| | |
|---|---|
| Density per DIN 53 420 [kg/m$^3$] | 1092 |
| Tensile strength per DIN 53 504 [N/mm$^2$] | 27.2 |
| Elongation at break per DIN 53 504 [%] | 450 |
| Graves tear test per DIN 53 515 [N/mm] | 83.7 |
| Shore D hardness per DIN 53 505 | 54 |
| Modulus of flexural elasticity | 374 |

EXAMPLE 3

The A Component was composed of a mixture of 73.9 parts of the polyoxypropylene polyoxyethylene triol cited in Example 1; 21.0 parts of 2,4′dimethyl-6-tert-butyl-1,3-phenylenediamine; 4.0 parts of release agent IV; and 1.0 parts of 1,4-diazabicyclo[2,2,2]octane in dipropylene glycol (33 wt. percent solution) and 0.1 parts dibutyl tin dilaurate as catalysts. The B Component was the same as in Example 1. One hundred parts of the A component and 50.4 parts of the B component—corresponding to an isocyanate index of 105 were processed into boards as in Example 1. After 22 demoldings, no sticking of the boards to the mold was observed, so that the preparation of the boards was discontinued.

The following physical properties were measured on a board which had been conditioned for one hour at 120° C.:

| | |
|---|---|
| Density per DIN 53 420 [kg/m$^3$] | 1079 |
| Tensile strength per DIN 53 504 [N/mm$^2$] | 25.6 |
| Elongation at break per DIN 53 504 [%] | 306 |
| Graves tear test per DIN 53 515 [N/mm] | 81.3 |
| Shore D hardness per DIN 53 505 | 57 |
| Modules of flexural elasticity per DIN 53 457 [N/mm$^2$] | 377 |

COMPARISON EXAMPLE

A comparison example was performed to show the effect of not adding the internal release agent. The A component was composed of a mixture of 77.9 parts of the polyoxypropylene polyoxyethylene triols cited in Example 1; 21.0 parts of 2,4-dimethyl-6-tert-butyl-1,3-phenylenediamine; 1.0 parts of 1,4-diazabicyclo[2,2,2]octane in dipropylene glycol (33 wt. percent solution) and 0.1 part dibutyl tin dilaurate as catalysts. The B component was the same as in Example 1. One hundred parts of the A component and 50.7 parts of the B component, corresponding to an isocyanate index of 105 were processed into boards as in Example 1. Prior to begining of the preparation of the boards, the mold was sprayed one time with a conventional external release agent. Seven boards were prepared in this manner; thereafter, the boards stuck to the mold.

The following mechanical properties were measured on a board which had been conditioned for one hour at 120° C.:

| | |
|---|---|
| Density per DIN 53 420 [kg/m$^3$] | 1090 |
| Tensile strength per DIN 53 504 [N/mm$^2$] | 32 |
| Elongation at break per DIN 53 504 [%] | 340 |
| Graves tear test per DIN 53 515 [N/mm] | 93.9 |
| Shore D hardness per DIN 53 505 | 58 |
| Modulus of flexural elasticity per DIN 53 457 [N/mm$^2$] | 430 |

The embodiments of the invention in which an exclusive privilege or property is claimed are defined as follows:

1. In a process for the one-shot preparation of polyurethane polyurea polymers by reaction injection molding wherein polyisocyanates, polyols, aromatic diamines and chain extenders are reacted in the presence of catalysts and optional blowing agents, auxiliaries and additives, the improvement comprising reacting said components in the presence of an amount effective for mold release of an internal mold release agent comprising at least one compound selected from the group consisting of carboxylic acid esters, amides, and esteramides prepared by the reaction of a mixture of montanic acid and at least one aliphatic carboxylic acid having ten or more carbon atoms with at least one reactive hydrogen compound selected from the group consisting of polyols, alkanolamines, and polyamines, wherein said reactive hydrogen compounds have a functionality of at least two, and a molecular weight of from 60 to 400, and wherein said internal release agent posseses an amine number from 0 to 100.

2. The process of claim 1 wherein said mixture of montanic acid and at least one aliphatic carboxylic acid contains from 5 to 95 percent by weight of montanic acid.

3. The process of claim 1 wherein said mixture of montanic acid and at least one aliphatic carboxylic acid contains from 20 to 60 percent by weight of montanic acid.

4. The process of claim 1 wherein said aliphatic carboxylic acid is selected from the group consisting of stearic acid, palmitic acid, ricinoleic acid, linoleic acid, linolenic acid, behenic acid, tallow oil fatty acids, fish oil acids, lauric acid, tall oil acids, and oleic acid.

5. The process of claim 1 wherein said reactive hydrogen compounds contains one or more tertiary amino groups.

6. The process of claim 1 wherein said alkanolamine contains one or more tertiary amino groups.

7. The process of claim 1 wherein mixtures of
(a) from 99.9 to 50 weight percent of at least one sterically hindered primary aromatic diamine whose amino groups are sterically hindered relative to polyisocyanates by at least one alkyl substituent on the ortho position of each amino group, and
(b) from 0.1 to 50 weight percent of at least one unsubstituted or substituted reaction primary aromatic diamine whose amino groups do not exhibit reduced activity relative to the polyisocyanates
are used as the aromatic diamines, whereby the weight percents are based on the total weight of the mixture of (a) and (b).

8. The process of claim 6 wherein said aliphatic carboxylic acid is selected from the group consisting of oleic acid and tall oil acid.

9. The process of claim 8 wherein said alkanolamine is selected from the group consisting of triisopropanolamine and triethanolamine.

10. The process of claim 1 wherein said internal release agents are utilized in amounts of from 0.1 to 20 percent by weight relative to the sum of the weights of the polyisocyanate, polyol, aromatic diamine and chain extender.

11. The process of claim 1 wherein said internal release agent is prepared by the esterification of one mole of montanic acid; two moles of an aliphatic carboxylic acid selected from the group consisting of tall oil fatty acid, oleic acid, and their mixtures; with one mole of an alkanolamine selected from the group consisting of triethanolalmine, triisopropanolamine, or their mixtures.

12. The polymer produced by the process of claim 1.

13. The polymer produced by the process of claim 8.

14. An internal release agent comprising at least one compound selected from the group consisting of carboxylic acid esters, amides, and esteramides prepared by the reaction of a mixture of montanic acid and at least one aliphatic carboxylic acid having ten or more carbons, with at least one reactive hydrogen compound selected from the group consisting of polyols, alkanolamines, and polyamines, wherein said reactive hydrogen compounds have a functionality of at least two, and a molecular weight of from 60 to 400, wherein said internal release agent possesses an amine number of from 0 to 100, and wherein said mixture of montanic acid and at least one aliphatic carboxylic acid contains from 5 to 95 percent by weight montanic acid.

15. The composition of claim 14 wherein said aliphatic carboxylic acid is selected from the group consisting of stearic acid, palmitic acid, ricinoleic acid, linoleic acid, linolenic acid, behenic acid, tallow oil fatty acids, fish oil acids, lauric acid, tall oil acids, and oleic acid.

16. The composition of claim 14 wherein said reactive hydrogen compound contains one or more tertiary amino groups.

17. The composition of claim 16 wherein said alkanolamine is selected from the group consisting of triisopropanolamine and triethanolamine.

18. The composition of claim 14 wherein said mixture of montanic acid and at least one aliphatic carboxylic acid contains from 20 to 60 percent by weight of montanic acid.

19. In a process for the preparation of polyurethane, polyisocyanurate, and polycarbodiimide polymers by polyisocyanate addition polymerization wherein internal release agents are utilized, the improvement comprising performing said polymerization in the presence of an effective amount of the release agent of claim 14.

* * * * *